(12) United States Patent
Abadi

(10) Patent No.: US 6,659,690 B1
(45) Date of Patent: Dec. 9, 2003

(54) TAPERED STRESS JOINT CONFIGURATION

(75) Inventor: Parviz Abadi, Aberdeen (GB)

(73) Assignee: ABB Vetco Gray Inc., Houston, TX (US)

( * ) Notice: Subject to any disclaimer, the term of this patent is extended or adjusted under 35 U.S.C. 154(b) by 7 days.

(21) Appl. No.: 09/983,049

(22) Filed: Oct. 18, 2001

Related U.S. Application Data

(60) Provisional application No. 60/241,703, filed on Oct. 19, 2000.

(51) Int. Cl.[7] .............................. F16L 13/04; F16L 35/00
(52) U.S. Cl. ................. 405/224.2; 405/224; 405/224.3; 166/242.1; 166/350; 166/367; 285/114; 285/223; 285/332
(58) Field of Search .............................. 405/195.1, 203, 405/224.1, 224.4, 224; 166/345, 350, 359, 367, 242.6, 242.2, 242.1; 285/223, 263, 114–116, 242, 332, 332.1; 403/41, 220, 223, 228

(56) References Cited

U.S. PATENT DOCUMENTS

| | | | | |
|---|---|---|---|---|
| 3,730,286 A | * | 5/1973 | Weiner ........................ | 175/320 |
| 4,256,417 A | | 3/1981 | Bohannon ................... | 405/195 |
| 4,363,567 A | * | 12/1982 | Van der Graaf ......... | 405/224.2 |
| 4,772,151 A | * | 9/1988 | Lammers et al. ........... | 403/162 |
| 4,934,871 A | | 6/1990 | Kazokas, Jr. ............... | 405/224 |
| 5,044,828 A | | 9/1991 | Berner, Jr. et al. ......... | 405/202 |
| 5,286,132 A | * | 2/1994 | Morini ........................ | 403/228 |
| 5,355,968 A | * | 10/1994 | Smith .......................... | 285/114 |
| 5,447,392 A | | 9/1995 | Marshall .................. | 405/224.4 |
| 5,683,205 A | | 11/1997 | Halkyard ................. | 405/224.2 |
| 5,873,677 A | * | 2/1999 | Davies et al. ............ | 405/195.1 |
| 6,386,798 B2 | * | 5/2002 | Finn ........................ | 405/224.2 |
| 6,422,316 B1 | * | 7/2002 | Schutz et al. ............... | 166/367 |
| 6,422,791 B1 | * | 7/2002 | Pallini, Jr. et al. ....... | 405/224.2 |

FOREIGN PATENT DOCUMENTS

| | | | | |
|---|---|---|---|---|
| CH | 673144 | * | 2/1990 | ................. 285/341 |
| FR | 1226222 | | 7/1960 | |
| GB | 2163227 | * | 2/1986 | ............. 285/289.1 |
| GB | 2193301 | | 2/1988 | |

\* cited by examiner

*Primary Examiner*—Jong-Suk Lee
(74) *Attorney, Agent, or Firm*—Bracewell & Patterson, L.L.P.

(57) ABSTRACT

A stress joint for a subsea riser has a reduced diameter intermediate section to reduce bending stresses on the connection between the stress joint and the riser as well as the subsea equipment. The stress joint having a riser joint with a threaded upper end for connection to a riser string. Attached to a lower end of the riser joint is an upper transition section that tapers from the diameter of the riser joint to a reduced diameter. An intermediate section below the upper transition section has a reduced outer diameter. A lower transition section connects the lower end of the intermediate section to the subsea equipment. The lower transition section is tapered from a reduced diameter to a larger diameter to ensure a firm connection with the subsea equipment.

18 Claims, 1 Drawing Sheet

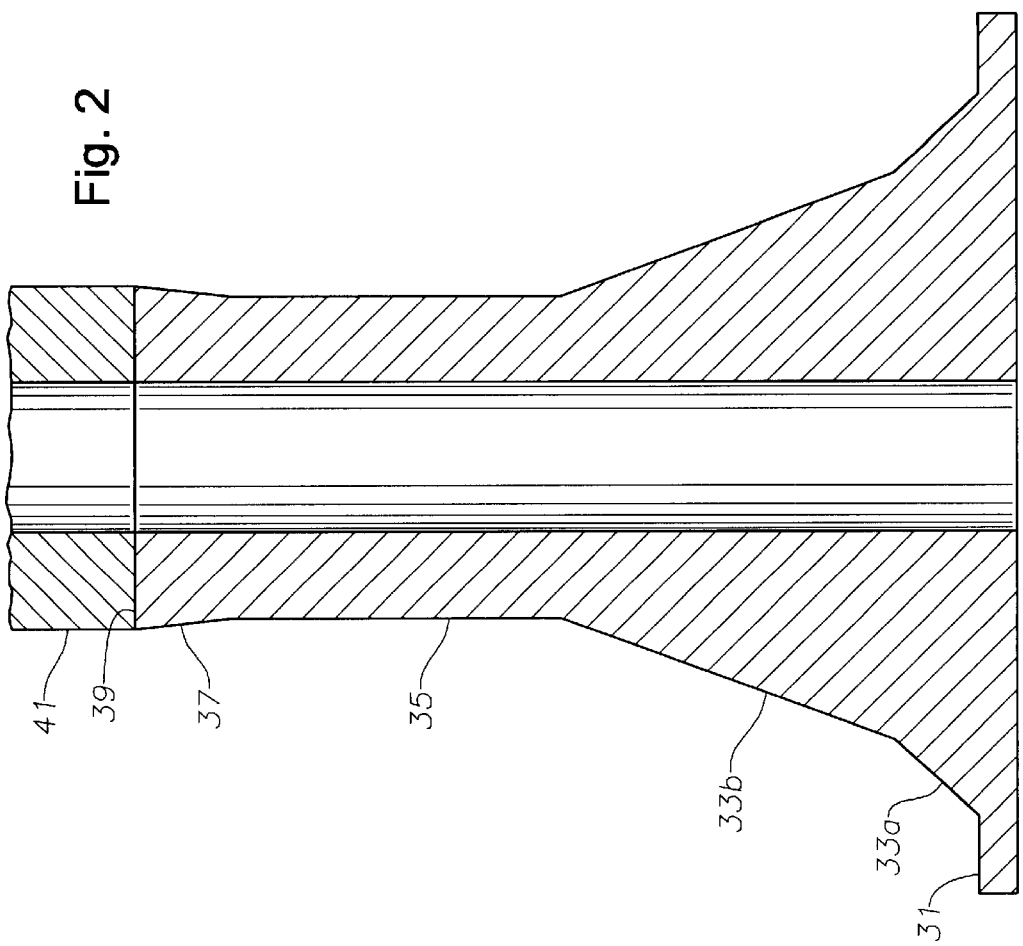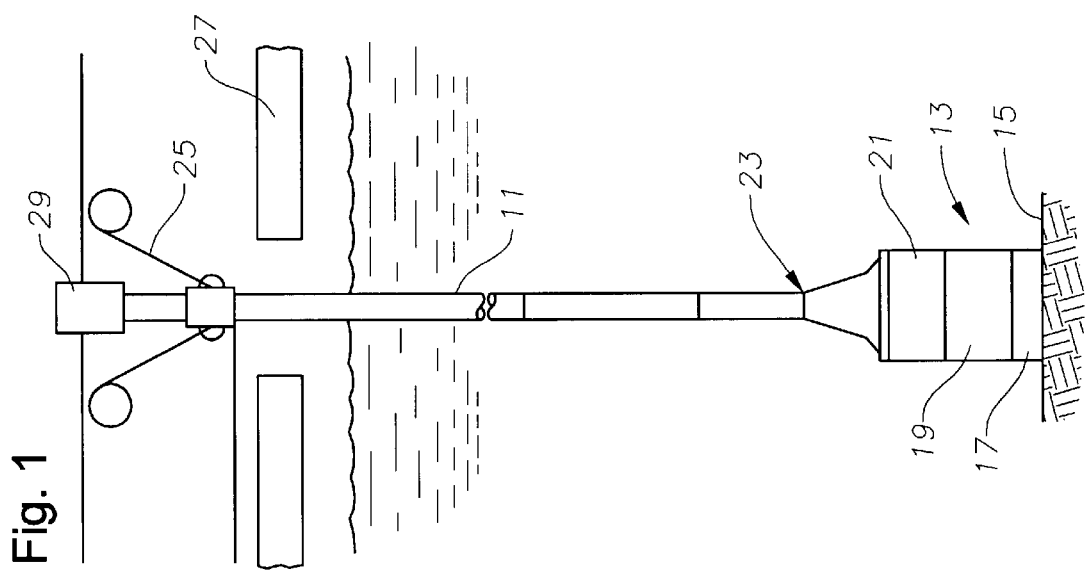

TAPERED STRESS JOINT CONFIGURATION

This application claims the benefit of U.S. Provisional Application No. 60/241,703, filed Oct. 19, 2000.

BACKGROUND OF THE INVENTION

1. Field of the Invention

The present invention relates generally to subsea pipe connectors. More specifically, the present invention relates to a subsea riser stress joint.

2. Description of the Related Art

In offshore operations it is often necessary to provide piping that runs from the subsea equipment to the surface structures to provide communication between the subsea well and the surface structure. For example, a completed well may have a riser that extends from the subsea production equipment on the ocean floor to a wellhead on the surface structure. Such risers are typically supported in tension by the surface structure and affixed to the subsea equipment by a stress joint. The riser is subject to various stresses as it is suspended from the surface structure. Ocean currents, wave motion and other external forces may create large bending stresses in the riser. These stresses can cause failure of the stress joint between the riser and the subsea equipment.

Various systems have been proposed to prevent the failure of the stress joint between the riser and the subsea equipment. In one such system a complex mathematical formula describes the exterior profile of the stress joint so that stresses are carried over the entire length of the stress joint to prevent joint failure. Other systems describe simply tapered sections that serve the same function of distributing the stresses over a longer section of the riser. A major failure of these systems is that the stresses from the riser are transmitted to the subsea equipment, therefore requiring stronger subsea equipment to withstand the stresses. The subsea equipment must also be fairly large because the tapered sections are quite large at their lower ends. The prior art stress joints are also fairly lengthy. This results in additional costs.

A further problem not addressed by the prior art is that there is typically a weld where the stress joint is connected to the riser. The typical stress joint may have a section of riser welded to the upper end of the stress joint to facilitate connection to the riser string. The weld between the section of riser and the stress joint is more brittle than either the stress joint or the riser. The prior art stress joints do not adequately protect this weld from failure due to bending stresses.

It would be advantageous to have a stress joint that isolated the subsea equipment from some of the stresses incurred by the riser. It would also be advantageous to have a stress joint that isolated the weld used to connect the stress joint to the riser from some of the stresses incurred by the riser. It would be best if this stress joint was not so large as to require the subsea structure to be enlarged to accommodate it. Therefore, the art has sought a stress joint that is smaller in physical size and that can reduce the stresses transmitted to either the subsea structure or the connection weld.

BRIEF SUMMARY OF THE INVENTION

In accordance with the present invention, a riser is suspended from a surface structure at an upper end such that a lower end is near subsea equipment. Between the subsea equipment and the riser a stress joint has a reduced diameter intermediate section to direct bending stresses away from the more brittle weld connection.

Another feature of the present invention is that the reduced diameter intermediate section directs bending stresses away from the subsea equipment. The stress joint of the present invention is also smaller and lighter than other similar stress joints.

The stress joint of the present invention is believed to increase the life of the weld joint between the stress joint and the riser as well as reduce fatigue on subsea equipment due to bending stresses. It may also be possible to use lighter duty subsea equipment due to the reduced size of the stress joint and the reduced bending stresses experienced by the subsea equipment.

BRIEF DESCRIPTION OF THE DRAWINGS

FIG. 1 is a schematic view of an offshore oil and gas riser and is shown as a stress joint constructed in accordance with this invention.

FIG. 2 is an enlarged view of the stress joint of FIG. 1.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

Referring to FIG. 1, riser 11 is used for conveying well fluids from a subsea well assembly 13, which is located at the sea floor 15. The subsea well, assembly 13 includes a wellhead 17 and production tree 19, shown schematically. A riser disconnect package 21 is located on top of production tree 19.

Riser 11 is subject to bending forces due to wind, waves and current. A stress joint 23 is located at the lower end of riser 11 where it connects to riser disconnect package 21. Riser 11 extends above sea level and is supported in tension by a riser tensioner 25 located on a platform 27. Platform 27 may be of a variety of types but likely will be of a type that is held in place by tension legs. A surface wellhead 29 will be located at the upper end of riser 11 on platform 27.

Referring to FIG. 2, stress joint 23 has a flange 31 on the lower end that will bolt, or otherwise fasten, to an upper portion of riser disconnect package 21. A lower transition portion, made up of sections 33a and 33b, extends upward from flange 31. Lower transition sections 33a, 33b are shown to be frusto-conical sections that are at different angles relative to each other, however, they could be a single continuous curve section or other types of profiles transitioning from the larger diameter of flange 31 to the smaller diameter of an intermediate section 35.

The intermediate section 35 extends upward from lower transition section 33b. Intermediate section 35 is preferably cylindrical and has the least wall thickness of any portion of stress joint 23. A short upper transition section 37, which is frusto-conical and inverted from lower transition sections 33a, 33b, joins the upper end of intermediate section 35. A termination riser joint 41 of conventional diameter for riser 11 is welded to the upper transition section 37 by a weld 39. The maximum outer diameter of upper transition section 37 is the same as the outer diameter of riser joint 41. The sections of riser 11 (FIG. 1) are secured together, preferably by threads or bolted flanges.

Stress joint 23 is made up of a single homogenous material, preferably steel. Weld 39 will be more brittle, and thus have a lower fatigue life than the remaining portions of stress joint 23. The intermediate section 35, having a thinner wall thickness than any other portion of stress joint 23, is thinner than riser 11, even thinner than termination riser joint 41, will have an increase in bending stress over what it would if it were the same thickness as termination riser joint 41. The fatigue life of intermediate section 35 is thus reduced by having a thinner wall section, however this increases the fatigue life of the weld 39. The thinner intermediate section 35 acts as a sink to absorb unwanted bending stress in the vicinity of weld 39. The bending stress occurring at weld 39 is moved into intermediate section 35 due to the lower bending stiffness of intermediate section 35.

Other factors for transferring the bending stress to intermediate section 35 include the increase in moment arm or the nature and profile of the applied load. For example, the fatigue life under normal subsea conditions for stress joint 23 if it did not have a thinner intermediate section 35, might be 100 years, while the fatigue life of a weld might be only one year. The use of the thinner intermediate section 35 may reduce the fatigue life of intermediate section 35 from 100 to 20 years. However, on the other hand it may increase the fatigue life of that in the area of weld 39 from 1 to 5 years. Consequently there would be a overall net increase in the life of stress joint 23.

Although intermediate section 35 is thinner than riser joint 41 in cross-sectional thickness, it is not necessarily a weak link in the riser. Generally, the cross-sectional thickness of riser joint 41 is based on maximum pipe internal diameter and minimum pipe outer diameter. These are limited by manufacturing drift tolerances. The intermediate section 35, however, is preferably machined with a high tolerance tool, therefore it can have the same capacity as riser joint 41. The tension at stress joint 23 due to tensioner 25 during normal usage is significantly lower than the maximum tension in riser 11 due to tensioner 25. Tensioner 25 is normally adjusted to give almost zero tension at the lower end of stress joint 23. This lower effective tension, as applied to intermediate section 35, will lead to a higher reserve bending capacity. Therefore, intermediate section 35 need not limit the overall capacity of riser 11.

In one example, for riser pipe having a wall thickness of 0.076 meters and an external diameter of 0.219 meters, stress joint 23 has the following dimensions:

| Item | Length | Max. External Diameter |
|---|---|---|
| Flange 31 | 0.14 meter | N/A |
| Lower Transition Section 33a | 0.5305 meter | 0.252 meter |
| Lower Transition Section 33b | 3.9 meters | 0.232 meter |
| Intermediate Section 35 | 3.16 meters | 0.214 meter |
| Upper Transition Section 37 | 0.1135 meter | 0.219 meter |

As can be seen by the above numbers, the difference between the external diameters of riser pipe and intermediate section 35 is only 0.005 meter, which is approximately 2.3%. This leads to a difference in wall thickness between the riser and the intermediate section of 6%, which is less than normal manufacturing drift tolerances for riser pipe. This differential can be increased to a maximum limit defined by the capacity requirements based on riser size and loads applied to the riser and still have the desired effect. In other words, because the tensioner 25 will reduce the vertical loads on the intermediate section 35, the intermediate section 35 may be made much thinner than the riser pipe 41 without risk of failure.

The invention is no(limited to use in the offshore environment. A reduced diameter stress joint 23 can be used to protect more brittle connections, whether welded, bolted or otherwise connected, in other applications where twisting or bending stress need to be isolated. The stress joint 23 may also be used to protect other critical structures that may be less tolerant to bending or twisting stress. Furthermore, the invention is not limited to a circular cross section. Stress joint 23 is equally effective at protecting brittle joints and sensitive elements in a tubular or solid applications of any cross section, including rectangular, octagonal, or any other polygonal section.

It is to be understood that the invention is not limited to the exact details of the construction, operation, exact materials or embodiment shown and described, as obvious modifications and equivalents will be apparent to one skilled in the art. For example, while the preferred embodiment is manufactured of steel, other materials may also be appropriate. Accordingly, the invention is therefore to be limited only by the scope of the appended claims.

I claim:

1. A subsea production riser for connecting a surface structure to subsea equipment, the riser comprising:

a string of production riser sections extending from an upper end near the surface structure to a lower end near the subsea equipment, the riser sections having an outer diameter;

an upper riser transition section extending below and having an upper end joined to a lower end of the string of production riser sections, the upper riser transition section tapering from a larger outer diameter at the upper end of the upper riser transition section to a smaller outer diameter at a lower end of the upper riser transition section;

a cylindrical intermediate riser section below the upper riser transition section and having an outer diameter that is the same as the smaller outer diameter of the upper riser transition section; and a lower riser transition section below the intermediate riser section and tapering from the outer diameter of the intermediate riser section to a lower outer diameter larger than the outer diameter of the upper end of the upper riser transition section.

2. The subsea riser of claim 1, wherein:

termination riser joint, upper riser transition section, intermediate riser section, and lower riser transition section have inner surfaces that form a uniform diameter cylindrical passage.

3. The subsea riser of claim 1, wherein:

the smaller outer diameter of the intermediate riser section is between 1% and about 10% smaller than the outer diameter of the upper end of the upper riser transition section.

4. The subsea riser of claim 1, wherein:

the upper riser transition section, intermediate riser section and lower riser transition section are formed from a single homogenous section of material.

5. The subsea risers of claim 1, wherein:
an axial dimension of the upper riser transition section measured along an axis of the subsea riser is less than an axial dimension of the intermediate riser section.

6. The subsea riser of claim 1, wherein:
an axial dimension of the upper riser transition section measured along an axis of the subsea riser is less than an axial dimension of the lower riser transition section.

7. The subsea riser of claim 1, wherein:
an axial dimension of the intermediate riser section measured along an axis of the subsea riser is less than an axial dimension of the lower riser transition section.

8. The subsea riser of claim 1, wherein:
the termination riser joint has an outer diameter that is the same as the outer diameter of the upper end of the upper riser transition section.

9. The subsea riser of claim 1, wherein:
the upper end of the upper riser transition section abuts and is welded to the termination riser joint.

10. A stress joint comprising:
a termination riser joint adapted for connecting to a lower end of a riser;
an upper transition section extending below and having an upper end joined to a lower end of the termination riser joint, the upper transition section tapering from a larger outer diameter at the upper end of the upper transition section to a smaller outer diameter at a lower end of the upper transition section;
an intermediate section below the upper transition section and having an outer diameter that is the same as the smaller outer diameter of the upper transition section;
a lower transition section below the intermediate section and tapering from the outer diameter of the intermediate section to a lower outer diameter larger than the outer diameter of the upper end of the upper transition section; and
a flange at a lower end of the lower transition section for connecting the stress joint to subsea equipment.

11. A subsea production riser for connecting a surface structure to subsea equipment, the riser comprising:
a string of production riser sections extending from an upper end near the surface structure to a lower end near the subsea equipment, the riser sections having an outer diameter; and
a riser stress joint between the lower end of the string of production riser sections and the subsea equipment, the riser stress joint having an upper riser transition section gradually reducing in outer diameter in a downward direction and joining a cylindrical intermediate riser section that has a constant outer diameter less than the outer diameter of the riser sections and a lower riser transition section that joins the intermediate riser section and extends downward, the lower riser transition section increasing in outer diameter in a downward direction; and
the upper riser transition section having a length less than the lower riser transition section and less than the intermediate riser section, the intermediate riser section having a length less than the lower riser transition section.

12. The riser of claim 11, wherein the riser stress joint further comprises:
a termination riser joint connected to the lower end of the riser string, an outer diameter of the termination riser joint being the same as the outer diameter of the riser sections; and
the upper riser transition section being welded to a lower end of the termination riser joint and being between the termination riser joint and the intermediate section, the upper transition section being an inverted frusto-conical shape having an outer diameter at an upper end equal to the termination riser joint and an outer diameter at a lower end the same as the outer diameter of the intermediate riser section.

13. The riser of claim 11, wherein:
the lower riser transition section has a frusto-conical shape with an outer diameter at an upper end of the lower riser transition section equal to the outer diameter of the intermediate riser section, and an outer diameter at a lower end of the lower riser transition section larger than the outer diameter of the riser sections.

14. The riser stress joint of claim 11, wherein:
the smaller diameter of the intermediate riser section is between about 1.5% and about 3% smaller than the outer diameter of the upper end of the upper riser transition section.

15. A subsea riser for connecting a surface structure to subsea equipment,
the riser comprising:
a string of riser sections extending from an upper end near the surface structure to a lower end near the subsea equipment, the riser sections having an outer diameter;
a riser stress joint between the lower end of the riser string and the subsea equipment, the riser stress joint comprising:
a termination riser joint connected to a lower end of the riser string;
an upper transition section welded to a lower end of the termination riser joint and tapering from a larger wall thickness at an upper end of the upper transition section to a smaller wall thickness at a lower end of the upper transition section;
an intermediate section below the upper transition section, the intermediate section having a wall thickness that is the same as the smaller wall thickness of the upper transition section;
a lower transition section below the intermediate section and tapering from the wall thickness of the intermediate section to a lower wall thickness larger than the wall thickness of the upper end of the upper transition section;
the upper transition section, intermediate section, and lower transition section having inner surfaces that form a uniform diameter cylindrical passage inside the riser stress joint;
an axial dimension of the upper transition section measured along an axis of the stress joint being less than an axial dimension of the intermediate section; and wherein
axial forces in the riser pass through the termination riser joint, upper transition section, intermediate section and lower transition section to the subsea equipment.

16. The subsea riser of claim 15, wherein:
an axial dimension of the upper transition section measured along an axis of the stress joint is less than an axial dimension of the lower transition section.

17. The subsea riser of claim 15, wherein:
an axial dimension of the intermediate section measured along an axis of the stress joint is less than an axial dimension of the lower transition section; and the wall thickness at the upper end of the upper transition section is the same as a wall thickness of the termination riser joint.

18. The subsea riser of claim 15, wherein:
the wall thickness of the intermediate section is between about 1% and about 10% smaller than the smaller wall thickness of the upper end of the upper transition.

* * * * *

UNITED STATES PATENT AND TRADEMARK OFFICE
CERTIFICATE OF CORRECTION

PATENT NO. : 6,659,690 B1
DATED : December 9, 2003
INVENTOR(S) : Parviz Abadi

It is certified that error appears in the above-identified patent and that said Letters Patent is hereby corrected as shown below:

<u>Title page,</u>
Item [57], ABSTRACT,
Line 4, delete "having" and insert -- has --

<u>Column 2,</u>
Line 36, delete the (comma) "," after "well"

<u>Column 4,</u>
Line 6, delete "no(limited" and insert -- not limited --
Line 53, insert -- the -- before "termination"

Signed and Sealed this

Twenty-seventh Day of April, 2004

JON W. DUDAS
*Acting Director of the United States Patent and Trademark Office*